UNITED STATES PATENT OFFICE.

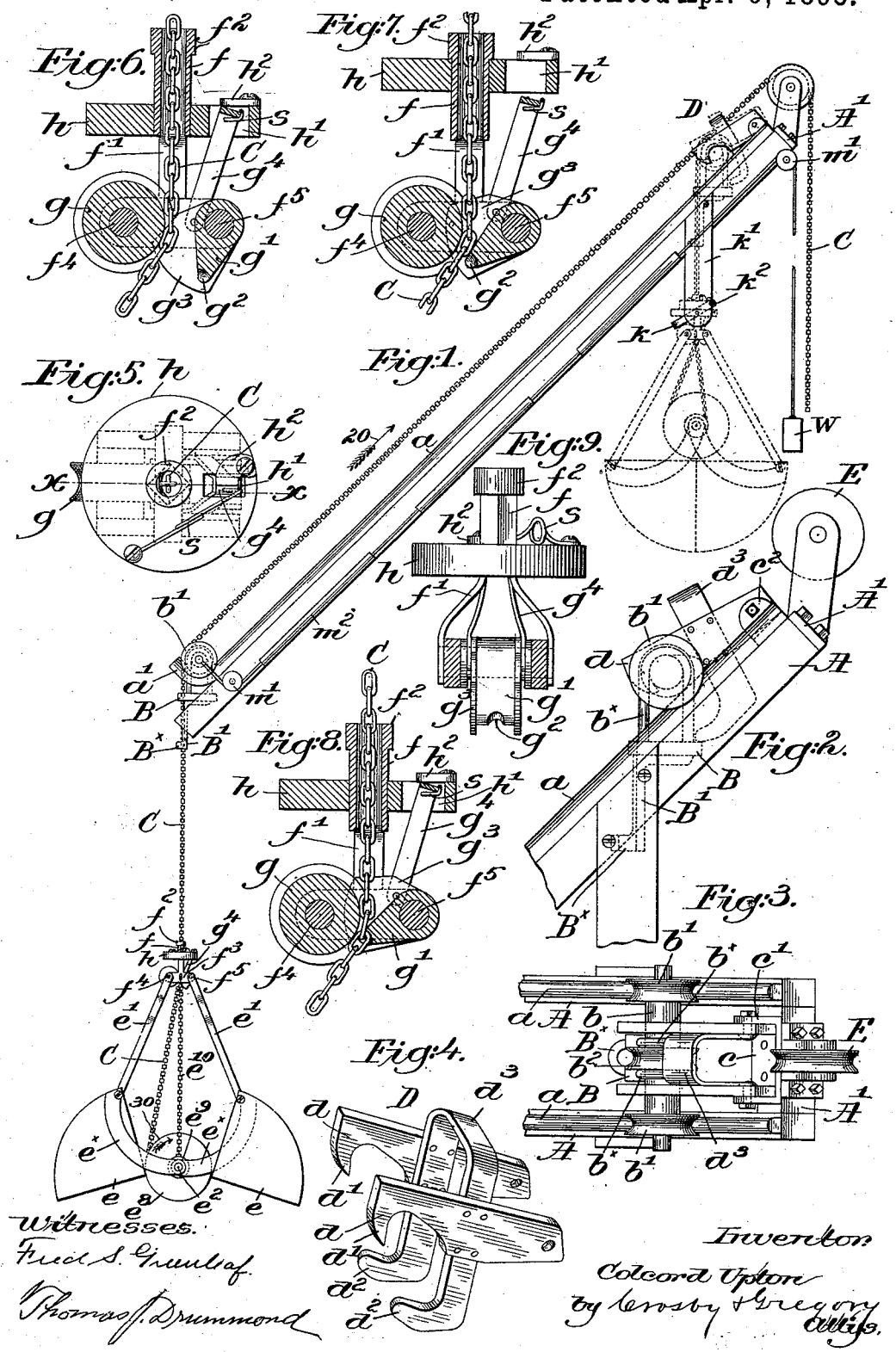

COLCORD UPTON, OF SALEM, MASSACHUSETTS.

DREDGING AND CONVEYING APPARATUS.

SPECIFICATION forming part of Letters Patent No. 537,251, dated April 9, 1895.

Application filed June 14, 1894. Serial No. 514,554. (No model.)

*To all whom it may concern:*

Be it known that I, COLCORD UPTON, of Salem, county of Essex, State of Massachusetts, have invented an Improvement in Dredging and Conveying Apparatus, of which the following description, in connection with the accompanying drawings, is a specification, like letters on the drawings representing like parts.

This invention refers to apparatus for hoisting and conveying material of various kinds from one place to another, wherein a bucket having movable jaws is used for handling mud, in dredging, or material in bulk, such as coal, grain, sand, &c., or wherein a grip is substituted for the bucket, the jaws of the grip being adapted to engage articles of merchandise and the like.

Prior to this invention, so far as I am aware, it has been usual to operate the jaws of the engaging mechanism by means of one or more cables or chains auxiliary to the main hoisting cable, the main and auxiliary cables being controlled from a distant point, and in addition to increasing the skill and labor necessary to properly operate the apparatus much trouble arises from improper overhauling and fouling of the cables.

It is often desirable in unloading coal, grain, &c., from the holds of vessels, to convey the loaded bucket to a fixed point, empty it, and return it expeditiously to the loading point in condition to be again filled, and with the assistance of the least possible amount of human labor, so that the operation of the apparatus as a whole is practically automatic. Accordingly, in this my invention I have provided means for controlling by a single cable the hoisting, conveying from one point to another, and opening or closing of the jaws of the bucket or grip, whereby the entire operation of the apparatus is controlled from one point, and by any usual form of single drum hoisting engine, the loading and unloading, while automatic, being absolutely regulated by the operator, substantially as will be hereinafter described.

Other features of my invention will be hereinafter described, and particularly pointed out in the claims.

Figure 1 represents in side elevation a sufficient portion of a hoisting and conveying apparatus, to be understood, embodying my invention. Fig. 2 is an enlarged detail in elevation of the detent at the end of the path of movement of and engaging the traveler. Fig. 3 is a top or plan view of the parts shown in Fig. 2. Fig. 4 is a perspective view of the detent, detached. Fig. 5 is a top view of a portion of the bucket-support and controlling device, to be described. Figs. 6, 7 and 8 are sectional views taken on the line $x-x$, Fig. 5, showing the relative position of the parts at different times in the cycle of operations. Fig. 9 represents in elevation and partial section the mechanism shown in Fig. 6, looking toward said figure from the left, the cable and guide wheel being omitted.

I have herein shown my invention as applied to an apparatus, wherein a fixed frame or boom A is suitably suspended in any desired manner from the wall of a building or wharf, as the case may be, the boom being of sufficient length to enable the load to be conveyed from the loading to the unloading point, and preferably inclined. Rails or tracks $a$ are secured to the upper side of the timbers forming the boom, and I have shown the outermost ends of the rails as upturned at $a'$ to form a stop for the traveler, to be described, at the outer end of its path of movement.

The traveler shown only in Figs. 1 to 3, consists of a shaft $b$, having suitably grooved wheels $b'$ loose thereon and adapted to roll and be guided on the tracks $a$, a cable sheave or wheel $b^2$ being also loosely supported on the shaft, preferably at its center, as clearly shown in Fig. 3. A frame B is freely suspended from the traveler between the timbers of the boom by elongated clips $b^\times$ engaging the shaft $b$ at opposite sides of the cable sheave $b^2$, the said frame having secured to or forming a part thereof, a depending arm B', provided with a cable guide $B^\times$, through which the cable C is passed, and thence over the sheave $b^2$. The movement of the traveler on the tracks $a$ is controlled by the cable C, as will be described. At the inner end of the path of movement of said traveler, herein shown as at the upper end of the tracks, I have secured a plate $c$, having ears $c'$ to which is pivoted a detent D, shown separately in Fig. 4, said detent consisting of arms having hooked outer ends $d$ adapted to engage the shaft $b$ of the traveler and hold the same at the inner ends of its path, the outer faces $d'$ of the hooked ends being cam-shaped, whereby the shaft $b$ will engage and lift the detent into dotted line position Fig. 1, until the hooks of the detent can pass over and engage the shaft of the traveler. One or more toes $d^2$ depend from the detent, and when the latter is in engagement with the traveler the toes are above and in position to be engaged by the frame B, as shown in dotted lines Fig. 2. The said frame is vertically movable relative to the traveler and constitutes tripping mechanism for the detent, to trip it and thereby release the traveler when desired. The detent is preferably provided with a guide $d^3$ through which the cable C is passed after it is led over a suitable sheave E, suitably mounted in stand rigidly secured to the cross piece A' of the boom or frame, as herein shown, the cable leading from said sheave to the hoisting engine, of any usual or suitable construction, not herein shown, as it forms no part of my invention, and which may be located at any desired point.

I have herein shown the bucket as composed of two members $e$, pivotally connected at their outer ends by links $e'$ to a support or frame, the jaws or members $e$ of the bucket having secured thereto straps or frames $e^x$, hinged together at $e^2$, the straps being so located or arranged that when the jaws $e$ are closed, as shown in dotted lines Fig. 1, the inner adjacent ends of the jaws will be brought together closing the bucket, the hinge $e^2$, which is the fulcrum of the jaws, being at such time located above the top of the bucket and its contents.

The cable C passes over the sheave $b^2$ on the traveler, and thence downward through the guide B$^\times$ of the frame B and through a hollow or sleeve-like portion $f$ of the support, and it is then connected to the hinge of the bucket jaws by suitable connection $s$, to be described.

Referring now more particularly to Figs. 5 to 8, the sides, as $f'$, of the support form a part of and carry at their upper ends the tubular or sleeve-like portion $f$, preferably of square or polygonal shape exteriorly in cross-section, as shown by dotted lines Fig. 5, below an annular flange or projection $f^2$ at its upper end, the sides $f'$ at their lower ends being provided with ears $f^3$ through which are passed studs $f^4$ and $f^5$, on which the upper ends of the links $e'$ are pivoted. A grooved guide wheel $g$ is mounted upon and free to rotate on the stud $f^4$ between the sides $f'$ of the support to guide the cable C and to act as an abutment for the said cable when the controlling device, to be described, is moved into operative position to engage and prevent inward movement of the cable the said abutment also preventing bodily movement of the cable away from the controlling device when the latter acts as a brake upon the outward movement of the cable.

In the specification hereinafter and in the claims, I shall designate movement of the cable C, or tendency to move it in the direction of the arrow 20, Fig. 1, as inward movement, as distinguished from movement in the opposite direction to said arrow, which I shall term outward movement of the cable.

A gripping jaw $g'$ having preferably a concaved end, as $g^2$, and provided at its sides with ears $g^3$, only one of said ears being shown in Figs. 6 to 8 inclusive, is loosely mounted on the stud $f^5$, the ears $g^3$ being pivoted to a loop-like link $g^4$, the upper end of the link being engaged by the free end of a suitable spring $s$, rigidly secured at its other end to a block $h$, free to slide upon the exterior of the sleeve $f$, but prevented from rotation thereon by the external shape of the latter, said block having an opening $h'$ therethrough to receive the upper end of the link $g^4$ at times and also to permit the passage of the end of the spring therethrough, a lug $h^2$ secured to or forming a part of the block $h$ projecting over the upper end of the link to engage and move it downward positively when it is desired to move the gripping jaw $g'$ into inoperative position, shown in Fig. 6. The jaw $g'$ when moved into the position shown in Fig. 7 by elevation of the block $h$ relative to the support, is held in such position, by stiffness of the spring $s$, in a yielding manner, so that outward movement of the cable C is permitted, the weight and movement of the bucket in opening being sufficient to draw the chain slowly down between the gripping jaw and the guide-roll or sheave $g$, the tension of the spring causing the jaw to act as a brake upon the cable and thereby preventing too rapid outward movement, but if the cable is drawn inward or upward, viewing said Fig. 7, the jaw will thereby be moved into position shown in Fig. 8, and it will grip the cable between its concaved end $g^2$ and the guide-roll, and the greater the strain upon the cable in an upward direction, the more tightly would it be gripped and held against such movement, so that the jaw forms a cable controlling device.

The block $h$ serves as an actuator for the controlling device by raising it into the position shown in Fig. 7, through the agency of the spring $s$, or by positively turning said jaw into the position shown in Fig. 6 by downward movement of the actuator $h$ relative to the support, the lug $h^2$ bearing against and positively forcing the link $g^4$ down with it.

The actuator $h$ and the controlling device are of sufficient weight in practice to normally remain in inoperative position on the support, as shown in Fig. 6, or to assume such inoperative position by gravity when inward strain has been removed from the cable.

In order to render the controlling device operative the actuator $h$ must be positively moved into operative position, and to effect such movement automatically, I have herein shown a rest or saddle $k$, see Fig. 1 pivotally supported in depending brackets $k'$ secured to the frame $a$ below the detent D in such manner that when the traveler has been moved up to and into engagement with the detent the actuator $h$ will be seated upon the rest $k$, as shown in dotted lines Fig. 1, the rest being U-shaped with the opening at the lower end. Normally the rest will assume the inclined position shown in full lines Fig. 1, a pin $k^2$ at its upper end being adapted to bear against the bracket $k'$ and limit the inclination of the rest, but when the actuator $h$ is seated upon said rest the weight of the frame and bucket supported thereby will be more than sufficient to turn the rest into horizontal dotted line position.

In buckets of the class herein shown, it is necessary when working stiff mud, coal, &c., to draw the jaws $e$ firmly together to force them through the material in order to properly fill the bucket therewith, and in order to close the jaws with great power I have pivoted between the strips $e^x$ a drum $e^8$, while a flexible connection, as $e^{10}$, is secured at one end to the support or frame and at its other end to the drum shaft $e^9$, which may be suitably grooved to receive it, if desired, it being observed that the shaft is of less diameter than the drum. When the jaws are open, as shown in full lines Fig. 1, the cable C is wound around the drum $e^8$, and it is to be supposed that the bucket and its described support are being lowered to the loading point, the support, cable controlling device, and actuator $h$ being in the relative position shown in Fig. 8.

When the bucket rests upon the material to be loaded thereinto, the actuator $h$ will drop by gravity on the sleeve $f$ into the position shown in Fig. 6, releasing the controlling device, so that the cable is free to be drawn inward or in the direction of the arrow 20, Fig. 1. Such movement will rotate the drum $e^8$ in the direction of the arrow 30, Fig. 1, as the cable C is unwound therefrom, the flexible connection $e^{10}$, however, being wound upon the drum shaft $e^9$, shortening said connection and drawing the hinge or fulcrum $e^2$ of the bucket jaws upward until the jaws have been closed, the leverage obtained by the difference in the diameter of the drum and its shaft enabling the jaws to be closed with great power. As soon as the jaws are closed, the cable still moving inward, the bucket and its support will be lifted bodily, and when it comes into contact with the traveler the latter will be moved along the tracks $a$ until it is brought into engagement with the detent D at the inner end of its path of movement, the detent being automatically raised by the traveler, as hereinbefore described, until the hooked ends $b^4$ engage the shaft of and hold the traveler stationary. At the same time the support and the parts carried thereby will have been brought into such position that the actuator $h$ will be seated upon the rest $k$, and when the frame and its attached bucket are lowered slightly by the slackening of the cable, the actuator will be moved relatively to the support F into the position shown in Fig. 7, and as the annular flange or projection $f^2$ prevents withdrawal of the actuator from the support the latter will be held stationary while the bucket is being emptied.

The bucket is emptied by slackening or permitting outward movement of the cable C, so that the weight of the bucket jaws and the load will cause them to swing downward and outwardly, the load dropping from the bucket as the jaws separate. The flexible connection $e^{10}$ will unwind from the shaft $e^9$ and the cable C will be wound upon the drum $e^8$ during such movement. After the bucket is emptied the cable is drawn inward, such movement thereof causing the gripping jaw $g'$ to grip it so that the support and the bucket will be moved bodily upward or toward the traveler. This movement withdraws the actuator $h$ from the rest $k$, while at the same time the frame B depending from the traveler will be lifted by impinging against the upper end of the sleeve $f$, until the frame engages and lifts the toe $d^2$ of the detent sufficiently to raise the hooked ends $d$ from engagement with and to release the traveler which will immediately move downward along the boom. When the traveler reaches the outer end of its path of movement it is checked by the stop $a'$, and continued outward movement of the cable lowers the bucket to the loading point, and the operation described is repeated.

From the foregoing it will be seen that the opening and closing of the bucket to load or unload, the lifting and lowering of the bucket as a whole, and its transference from one place to another, are accomplished with a single cable, the controlling device and its actuator rendering this possible, and owing to the yielding pressure exerted by the gripping jaws upon the cable in its outward movement, when the controlling device is in the position shown in Fig. 7, the cable cannot overhaul itself so rapidly as to become entangled or thrown off the drum $e^8$.

When the cable is allowed to run out without any control it will tend to foul or tangle with the co-operating parts of the apparatus, and particularly would it be liable to overrun or be thrown off the drum $e^8$. The brake action of the gripping jaw upon the cable, passing between it and the sheave or abutment $g$, however, prevents the rapid passage of the cable outwardly, and prevents it from fouling by exerting enough pressure upon it to keep it moderately taut.

It will be obvious that the strength of the spring which controls the gripping jaw will be regulated by the size and weight of the cable, and by the speed which may be safely permitted in the outward movement of the cable.

To render the return of the traveler with the empty bucket more rapid, cables as $m$, passed over guide-rolls $m'$, located at the inner and outer ends of the path of movement of the traveler, are secured at their ends respectively to the traveler and to a counterbalance weight W, and in order to effectually prevent any possible fouling of the counterbalance cable, I have shown it in Fig. 1 as carried through a series of tubular guides $m^2$, secured to the side of the boom near its lower corners.

It is obvious that the inclination of the boom or frame A is immaterial to the operation of the apparatus herein described, and the boom may be of any desired length, it being observed that the greater the inclination of the boom the less the weight of the counterpoise, and in many instances the counterpoise may be dispensed with altogether.

The operator standing at the drum of the hoisting engine will first cause the cable to be drawn inward to close the jaws of the bucket upon the load and to lift and convey the loaded bucket to the point at which it is to be emptied, and he will then release or reverse the movement of the hoisting drum to slacken or allow the cable to run outward, thereby opening the jaws and emptying the bucket. He will then operate the drum to draw the cable inward, which will lift the bucket to actuate the tripping mechanism and tripping detent to release the traveler, and then he will permit the cable to run outward until the traveler reaches the outer end of its path and the bucket has been returned to the loading point.

While I have herein illustrated my invention in connection with a stationary or fixed boom, my invention is not limited thereto, nor is it limited to the use of a bucket such as shown, as it is equally applicable to apparatus on which a swinging boom is employed, or in handling articles of merchandise in unloading and loading vessels, the jaws in such instance being suitably shaped to grip the particular articles operated upon.

While I have herein shown and described one specific form of device which acts upon the cable and prevents too rapid outward movement of the same, and consequent fouling or slackening of the cable, and have claimed the same specifically, yet I do not herein claim broadly a friction or other retarding device to act upon and prevent too rapid outward movement of the cable, as a retarding device for such purpose is described and generically claimed in another application filed by me January 25, 1895, Serial No. 536,206.

I claim—

1. In a hoisting apparatus, a hoisting cable, a support movable relatively thereto, a bucket having movable jaws hinged at their inner ends, and connections between the support and the outer ends of the jaws, and the cable and hinged ends of the jaws, respectively, combined with a normally inoperative cable-controlling device on said support comprising a yielding gripping jaw adapted to bear on the cable when the device is in operative condition, to permit movement of the cable toward the bucket, and an independent rest to move said controlling device into operative position and also to hold the support stationary when the cable is slackened to open the jaws, upward movement of the cable being prevented by the gripping jaw while the controlling device remains in operative position, substantially as described.

2. A hoisting cable, a support movable relatively thereto, a plurality of jaws pivotally connected at their outer ends to said support, and connections between the cable and the inner ends of the jaws, to open and close them by movement of the cable, combined with a cable controlling device comprising a yielding gripping jaw adapted to bear upon the cable and act as a brake upon its outward movement, an abutment opposite said jaw and to prevent movement of the cable laterally therefrom, and an actuator for and connected to said jaw and movable on the support, and means to positively move the actuator relatively to said support to positively bring the gripping jaw into positive engagement with any portion of and to thereby lock the cable, from inward movement when so engaged the actuator being moved by gravity into inoperative position to release the jaw from positive engagement with, and thereby permit outward movement of the cable, substantially as described.

3. In a hoisting apparatus, a hoisting cable, a support movable relatively thereto, a bucket having movable jaws hinged at their inner ends, and connections between the support and outer ends of the jaws, and the cable and hinged ends of the jaws, respectively, combined with a normally inoperative cable controlling device on said support, comprising a yielding gripping jaw to bear on the cable at any point and prevent inward movement thereof when the device is in operative position, a co-operating abutment opposite thereto and between which and the said jaw the cable passes, and an actuator for the gripping jaw movable on a portion of and relative to said support, upward movement of the cable closing the movable jaws and thereafter moving the loaded bucket and the support bodily, and means located at a fixed point to positively move the actuator for the gripping jaw to render the latter operative, to bear upon the cable, and also to hold the support stationary when the cable is slackened to open the jaws and empty the bucket, the gripping jaw of said controlling device thereafter preventing upward movement of the cable relative to the support and consequently closure of the jaws until the bucket has been returned to loading position, the actuator for the gripping jaw moving it into inoperative position by gravity, substantially as described.

4. In a hoisting and conveying apparatus, a traveler, a track therefor, a fixed stop at one end and a detent at the other end of the path of movement of and to automatically engage the traveler, when brought into engagement therewith, and a cable supporting sheave on the traveler, combined with a hoisting cable passed over said sheave and to move the traveler on its track, tripping mechanism depending from and movable relative to the traveler below the sheave, to move the detent and thereby release the traveler, and a device carried by the cable between its outer end and the tripping mechanism, and controlled by the inward movement of the cable, to move the tripping mechanism, into engagement with the detent substantially as described.

5. In a hoisting and conveying apparatus, a traveler, a track upon which it moves, a fixed stop at the outer end of the track, and a detent at the inner end of the path of movement of and to engage the traveler, and a cable supporting sheave and tripping mechanism carried by the said traveler, combined with a hoisting cable passed over said sheave, a support on the cable beyond the sheave, jaws pivotally connected to said support, to grasp the load, inward movement of the cable bringing the support into engagement with and to operate the tripping mechanism and move the detent, to thereby release the traveler, and a counterbalance to return the traveler to the outer end of the track when released by the detent, substantially as described.

6. In a hoisting and conveying apparatus, a traveler, a detent at the inner end of the path of movement of and to engage the traveler, a cable passed over a sheave on said traveler and adapted to move it to the detent, a support movable on the cable, movable jaws pivotally connected to said support, to grasp the load, connections between the cable and the jaws, to close them, and tripping mechanism to trip the detent and release the traveler, combined with a controlling device on the support, to regulate the movement of the cable therethrough, a fixed seat to sustain the support when the traveler is held by the detent, so that the jaws may be opened, inward movement of the cable bringing the support into engagement with and operating the tripping mechanism to release the traveler, whereby the latter is free to move to the outer end of its path with the support and jaws, substantially as described.

7. In a hoisting apparatus, a hoisting cable, a support movable relatively to and through which said cable is loosely extended, a bucket having movable jaws pivotally connected to said support at their outer ends, a rotatable drum to which the inner ends of the jaws are pivoted and around which the cable is wound and secured at its outer end, and a flexible connection secured at its ends to the support and drum shaft respectively, to be wound thereon when the cable is unwound, and vice versa, to thereby close or open the bucket jaws, combined with a yielding gripping jaw carried by said support and pressing against the cable, to retard the outward movement thereof, and thereby prevent its fouling or slipping off from the drum, and means to move said jaw into positive engagement with and to lock the cable from inward movement, substantially as described.

8. In a hoisting and conveying apparatus, a traveler, means to positively stop it at one end of its path of movement, a detent at the other end of said path to automatically maintain the traveler stationary when moved adjacent thereto, and a cable supporting sheave on the traveler, combined with a hoisting cable passed over said sheave and to move the traveler toward the detent, a support on and movable relatively to the cable, jaws pivotally connected to said support, to grasp the load, a normally inoperative cable controlling device on said support, an independent rest to move said controlling device into operative position and also to hold the support stationary when the cable is slackened to open the jaws, and tripping mechanism to release the detent and permit the traveler to return to its normal position, such movement of the traveler disengaging the support and the rest, substantially as described.

In testimony whereof I have signed my name to this specification in the presence of two subscribing witnesses.

COLCORD UPTON.

Witnesses:
JOHN C. EDWARDS,
FREDERICK L. EMERY.